C. G. ROLINE ET AL

March 12, 1929 MACHINE FOR FOLDING THE CORNERS OF BOOK COVERS Re. 17,231

Original Filed June 10, 1922 5 Sheets-Sheet 1

Inventors:
Carl G. Roline.
Charles Norre.
By J. F. Jochum Jr.
Atty.

March 12, 1929. C. G. ROLINE ET AL Re. 17,231

MACHINE FOR FOLDING THE CORNERS OF BOOK COVERS

Original Filed June 10, 1922 5 Sheets-Sheet 2

Inventors:
Carl G. Roline
Charles Norre
By J. F. Lechner Jr.
Atty.

March 12, 1929. C. G. ROLINE ET AL Re. 17,231

MACHINE FOR FOLDING THE CORNERS OF BOOK COVERS

Original Filed June 10, 1922 5 Sheets-Sheet 3

Inventors:
Carl G. Roline.
Charles Norre.
By J. Yochum Jr.
Atty

March 12, 1929. C. G. ROLINE ET AL Re. 17,231
MACHINE FOR FOLDING THE CORNERS OF BOOK COVERS
Original Filed June 10, 1922 5 Sheets-Sheet 4
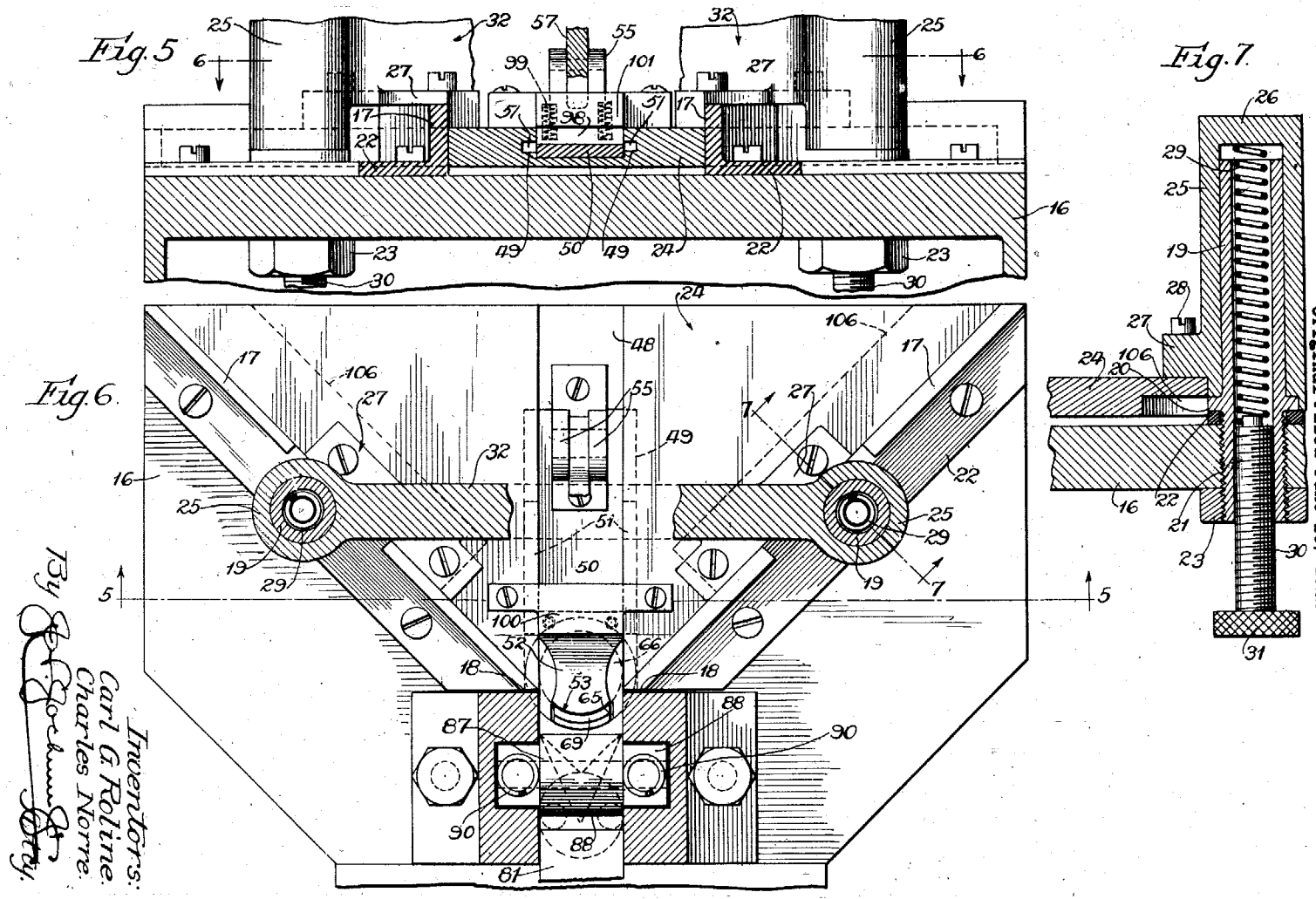
Inventors:
Carl G. Roline.
Charles Norre.
By J. F. Jochum Jr.
Atty.

C. G. ROLINE ET AL

March 12, 1929. MACHINE FOR FOLDING THE CORNERS OF BOOK COVERS Re. 17,231

Original Filed June 10, 1922 5 Sheets-Sheet 5

Inventors:
Carl G. Roline.
Charles Norre.
By J. F. Jochum Jr.
Atty.

Reissued Mar. 12, 1929. Re. 17,231

UNITED STATES PATENT OFFICE.

CARL G. ROLINE AND CHARLES NORRE, OF CHICAGO, ILLINOIS, ASSIGNORS TO UNITED SHOE MACHINERY CORPORATION, OF PATERSON, NEW JERSEY, A CORPORATION OF NEW JERSEY.

MACHINE FOR FOLDING THE CORNERS OF BOOK COVERS.

Original No. 1,632,452, dated June 14, 1927, Serial No. 567,265, filed June 10, 1922. Application for reissue filed March 5, 1928. Serial No. 259,300.

This invention relates to improvements in folding machines particularly adapted, though not necessarily limited in its use, for folding round corners of book covers.

Heretofore considerable difficulty and inconvenience has been experienced with the covers of books having round corners in that t has been necessary to fold the encasing sheet over the round corners of the filler or body of the cover by hand. This not only necessitates considerable time but it is a more or less expensive operation as it requires considerable skill to fold the corners neatly, and as the hand folded result of this operation has not always been a neat job, sheets have been pasted over the inner faces of the body of the cover and the folded over edge and corner of the covered sheet.

It is one of the objects of the present invention to provide improved means whereby the round corners may be expeditiously and neatly folded and secured in position by the employment of mechanical means.

A further object is to provide mechanism of this character embodying an element which not only co-operates with the rounded corner of the filler member or body to constitute a partial form over which the material is folded, but which also serves as a reenforcement for the body portion of the cover, especially where thin and extremely flexible material is employed for the filler member or body portion.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 5 is a detail sectional view on line 5—5, Figure 6.

Figure 6 is a horizontal sectional view taken on line 6—6, Figure 5, and with parts omitted.

Figure 7 is an enlarged detail sectional view taken on line 7—7, Figure 6.

Figure 1:
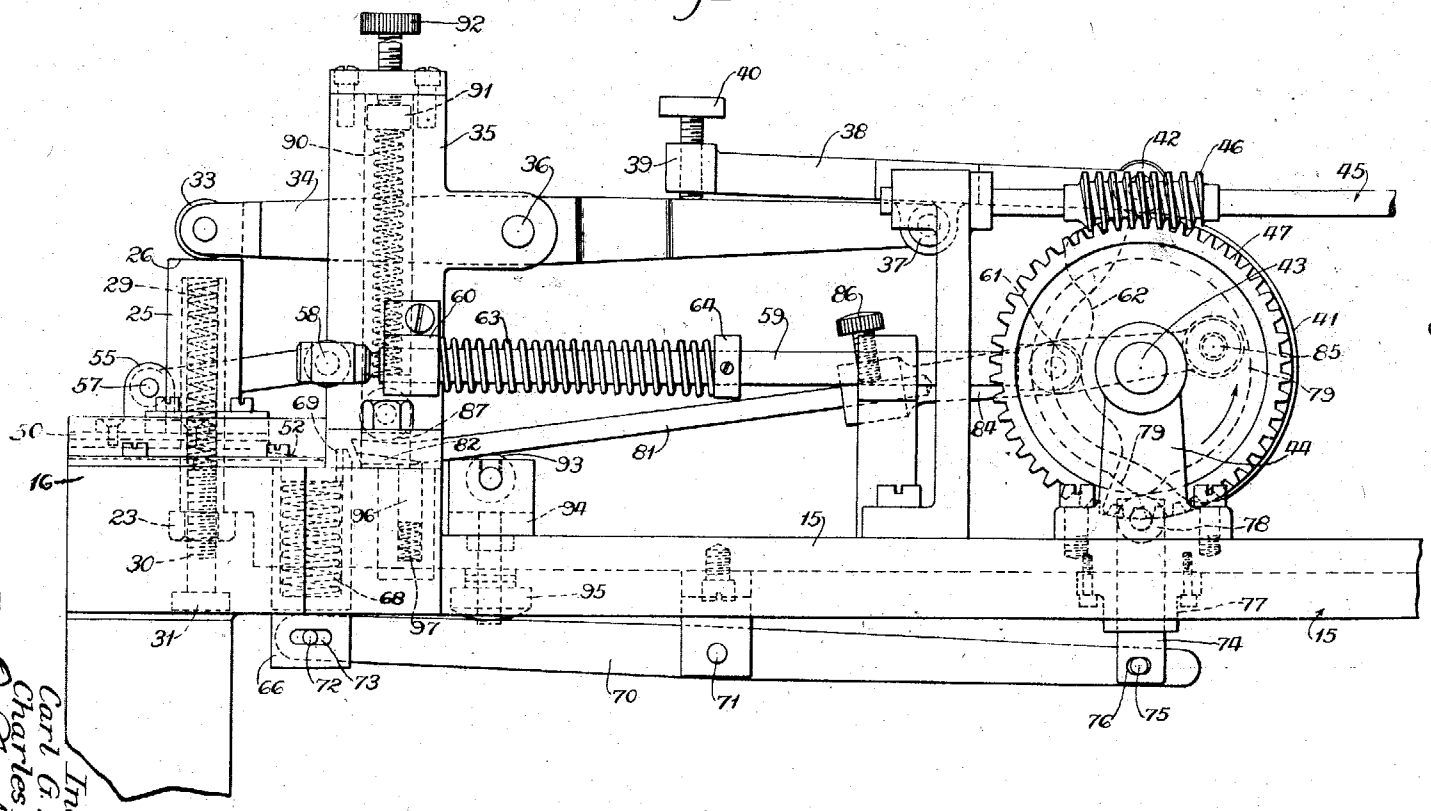
Figure 1 is a side elevation.
Figure 2:
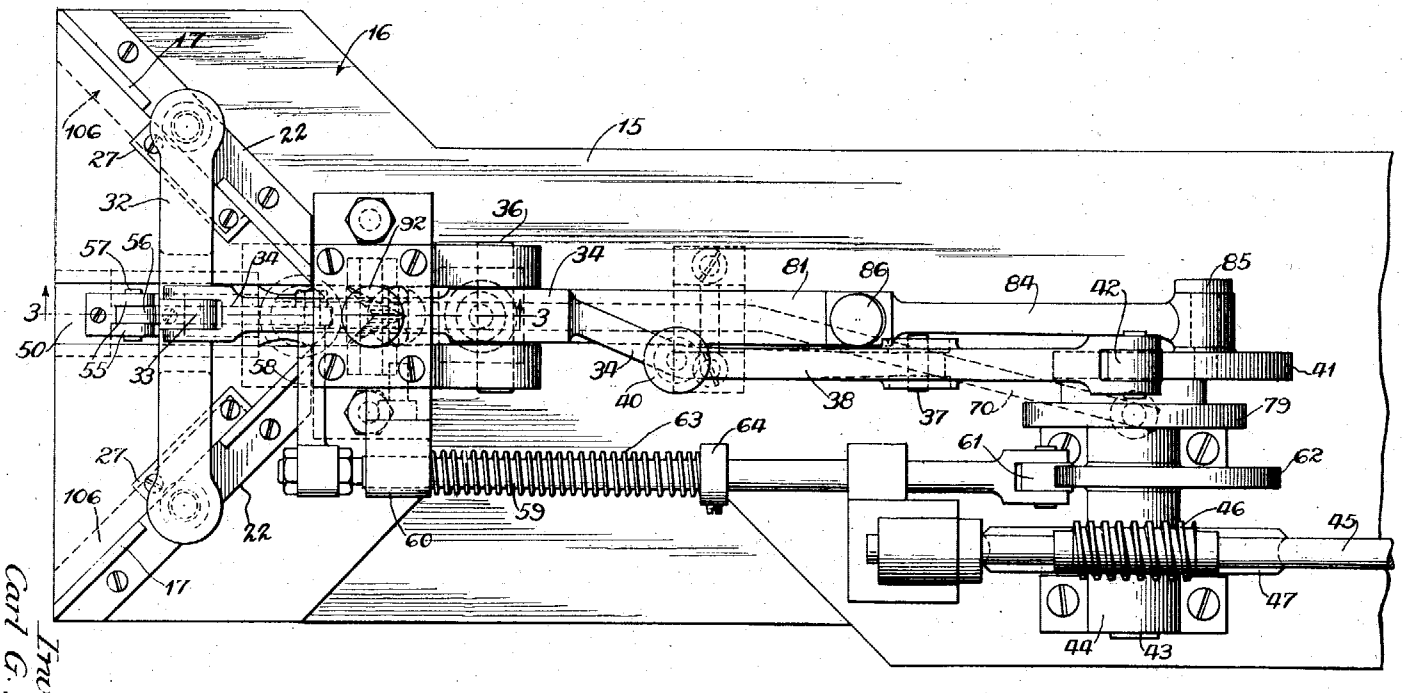
Figure 2 is a top plan view.

Referring more particularly to the drawings, the numeral 15 designates a support preferably in the form of a bed plate which may itself be supported in any desired or suitable manner and is of any desired construction, the forward end 16 of the bed being preferably enlarged, and secured to the face of this portion 16 are upright guides 17, preferably in the shape of angle irons. These guides 17 are arranged at right angles to each other and the forward extremities 18 thereof terminate short of each other so that when a book cover is placed upon the bed within the guides 17 and advanced so as to contact with the guides, the corner of the cover will project through the opening intermediate the extremities 18 of the guides.

Secured to the bed 16 and preferably a considerable distance in the rear of the extremities 18 of the guides 17 are tubular uprights 19, which are spaced laterally from each other and are provided with shoulders 20 intermediate the ends thereof, the extremities 21 of the uprights 19 being provided with exterior screw threads below the shoulder 20 and the portion 21 is adapted to pass through suitable openings in the bed 16 and also through the base 22 of the guides 17, each of the uprights 19 being secured in position by means of a nut or collar 23 engaging the threaded extremity 21 beneath the bed 16 and co-operating with the shoulder 20 to clamp the bed 16.

Arranged to operate within the guides 17 is a clamping member 24, which co-operates with the face of the bed 16 to clamp the book cover therebetween when the latter is in position and one corner thereof projects between the ends 18 of the guides 17.

This clamping member 24 is adapted to be reciprocated toward and away from the bed 16 during the clamping and unclamping movements thereof and is guided in its movement by means of tubular members 25 having closed upper ends 26 and adapted to telescope over the open upright tubular guides 19. These members 25 are secured to the clamping member 24 in any suitable manner preferably by means of a flange 27 through which fastening screws 28 pass and engage the clamping member.

Arranged within each tubular member 19 is a coil spring 29, one end of which projects through the open upper end of the tubular member 19 and engages the closed end 26 of the member 25. The other end of the spring engages an adjusting screw 30, which is threaded into the lower end of the tubular member 19 and is provided with a knob or handle 31, by means of which the screw may be adjusted to vary the tension of the spring 29.

The normal tendency of the springs 29 is to elevate the clamping member 24 by their engagement with the closed ends 26 of the tubular members 25, and the height of the member 19 is such that it will not interfere with the clamping operation of the member 24.

The tubular members 25 are connected by means of a web 32 and this web is engaged by a roller 33, carried by an arm 34, the latter being pivotally mounted intermediate spaced uprights 35 as at 36, the free end of the arm 34 being pivotally connected as at 37 with the arm 38 intermediate the ends of the latter. The end 39 of the arm 38 projects over the arm 34 and is provided with an adjusting screw 40, which engages the arm 34 for varying the position of the arm 38 with respect to the arm 34 for the purpose of adjusting the clamping member 24 to compensate for varying thicknesses of the covers to be operated upon.

The arm 34 is rocked about its pivot 36 to depress the clamping member 24 against the stress of the springs 29, in any desired or suitable manner but preferably by means of a cam 41, which is engaged by an anti-friction roller 42 carried by the end of the arm 38.

This cam 41 is connected with a shaft 43 journaled in suitable bearings 44 mounted upon the base 15, and motion is imparted to the shaft 43 and the cam 41 in any desired or suitable manner preferably from a driven shaft 45 having a worm 46 connected thereto and which worm engages a worm gear 47 connected with the shaft.

Thus it will be manifest that when the shaft 43 is rotated in the direction indicated by the arrow in Figure 1 the cam 41 will rotate and will engage the anti-friction roller 42 carried by the arm 38 to rock the arm 34 about its pivot 36, causing the anti-friction roller 33 at the forward end of the arm 34 to depress the clamping member 24 against the stress of the springs 29, and hold it depressed during the interval of time that the cam 41 is in engagement with the roller 42. As soon as this cam passes out of engagement with the roller 42, the stress of the springs 29 will operate to raise the clamping member 24.

During the reciprocating movement of the clamping member 24 the latter will also be guided by means of the flanges 17, the latter being of a height to serve such purpose.

The clamping member 24 is provided with a slot 48 therethrough and in alinement with the opening between the extremities 18 of the flanges 17, and the walls of this slot are provided with guide grooves 49 (see particularly Figures 5 and 6).

Figure 10:
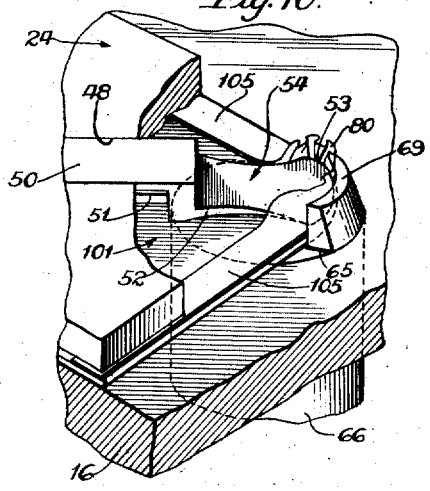

Arranged within the slot 48 is a combined shaper and reenforcing member 50, the body portion of which is provided with laterally projecting ears or ribs 51, which reciprocate within the grooves 49. The forward end of the member 50 is preferably depressed as at 52 (see particularly Figures 3 and 10) so that the lower face of the portion 52 will be disposed so as to be moved into close proximity to the proximate face of the bed 16, and is parallel thereto. The forward extremity 53 of the portion 52 is rounded so as to conform to the contour of the corner of the book cover while the upper face 54 of the portion 52 is convexed and inclines upwardly from the extremity 53.

The member 50 moves bodily with the clamping member 24 and is adapted for reciprocation with respect thereto so that after the clamping member 24 is in a position to clamp the book cover upon the bed 16, the member 50 will be advanced so that the extremity of the portion 54 will be projected through the opening between the extremities 18 of the flanges 17 to cause the extremity 53 to coincide with the rounded extremity of the filler or body portion of the cover so that the covering material when it is folded over the body portion or filler, in a manner to be hereinafter set forth, will also be folded over the extremity of the portion 52 of the member 50, after which the member 50 recedes to permit of the completion of the folding operation, also in a manner to be hereinafter set forth.

This member 50 may be reciprocated in any desired or suitable manner but preferably in the manner which will now be described.

The member 50 is provided with spaced ears 55, between which one end of a link 56 is pivotally connected as at 57. The other end of the link 56 is pivotally connected with an arm 58, the latter preferably projecting laterally from the link 56 and is connected with a reciprocating bar or member 59 mounted to slide in a suitable bracket 60. An anti-friction roller 61 is connected with the free end of the rod 59 and engages a cam 62 connected with the shaft 43 to rotate therewith so that when the shaft 43 is rotated in the direction indicated by the arrow in Figure 1, the cam 62 engaging the anti-friction roller 61 on the arm 59 will move the latter in a direction to cause the member 50 to recede or move to the left (Fig. 3) in the slot 48 of the clamping member 24.

The movement of the member 50 in the opposite direction is accomplished preferably by means of a spring 63, which latter encompasses the bar 59, one end of the spring engaging and resting against the bracket 60, while the other end of the spring engages a collar 64 adjustably mounted upon the bar 59 and by means of which collar the tension of the spring 63 may be varied.

It will therefore be seen that the member 50 is moved in one direction by positive means, to-wit: the cam 62, roller 61 and arm 59, and is moved in the opposite direction by means of the spring 63 engaging the bracket 60 and the shoulder 64.

The bracket 60 and arm 59 are maintained at all times in the same horizontal plane while the member 50 being connected with the clamping member 24, reciprocates in a direction to raise and lower it, and this operation of the member 50 with respect to the bar 59 is permitted by reason of the link 56.

Figure 3:
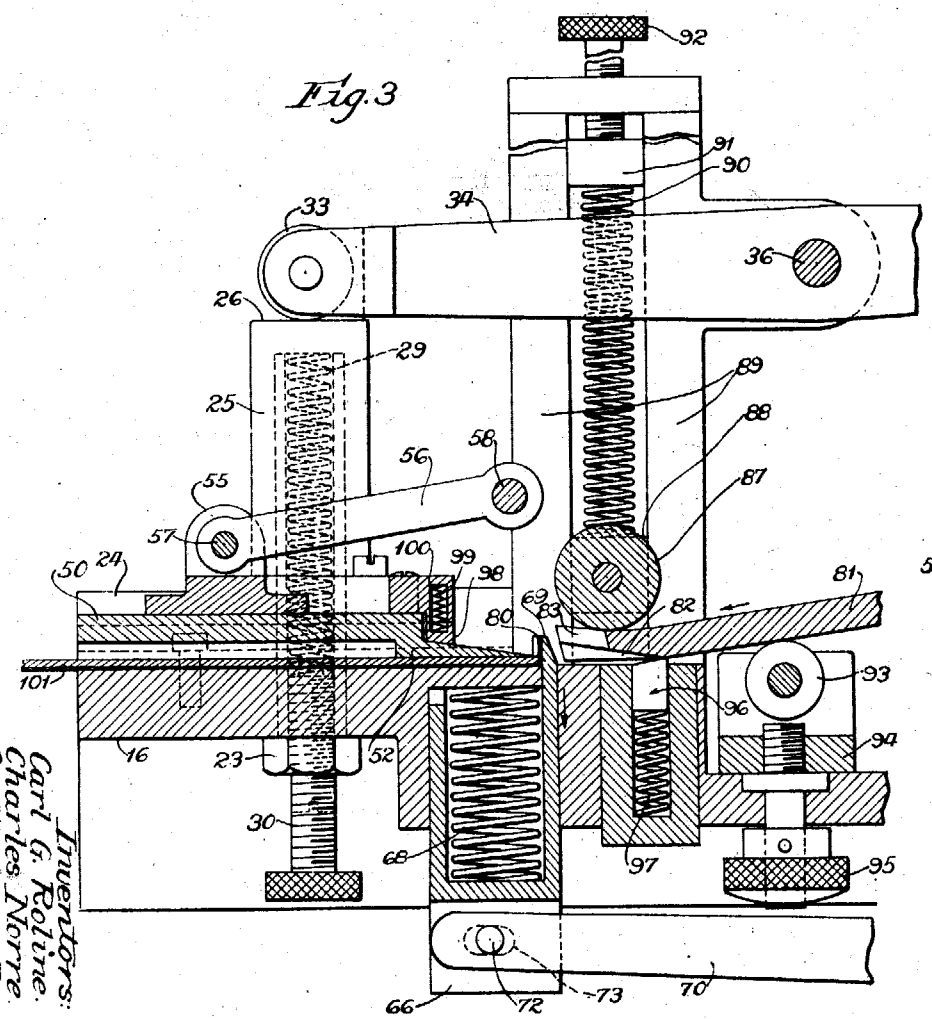
Figure 3 is an enlarged detail sectional view taken on line 3—3, Figure 2.

The base 16 is provided with a slot 65 therethrough adjacent the opening between the extremities 18 of the flanges 17 and this slot is constructed on an arc of a radius corresponding with the radius of the round corner of the book cover, the inner wall of the slot being disposed in such a position that when the corner of the book cover is projected through the opening between the ends 18 of the flanges 17, as shown in Figure 3, the periphery of the corner of the cover will stand in close proximity to the slot.

Supported beneath the bed 16 is a folding member 66, which is provided with a chamber 67, within which is arranged a spring 68, one end of the spring engaging the bottom of the chamber and the other end of the spring projecting through the open and upper end of the chamber and engaging the lower face of the bed 16. This member 66 is provided with a tongue or flange 69 which projects above the top of the member and is of a shape to conform to and project through the slot 65.

The normal tendency of the spring 68 is to depress the member 66 and withdraw the flange 69 so that it will stand below the upper face of the bed 16 and the member 66 may be moved in the opposite direction and against the stress of the spring 68 in any suitable manner.

A simple and efficient means for accomplishing this movement embodies a lever 70, which is pivotally connected intermediate its ends as at 71 to a suitable fulcrum and is preferably arranged beneath the portion 15 of the bed. The forward end of the lever 70 is connected with the member 66 preferably by means of a pin and slot connection 72—73, so that when the lever is rocked about its pivot 71 in one direction the member 66 will be raised and when rocked in the opposite direction the spring 68 will permit the member 66 to be depressed.

An upright 74 is connected with the free end of the lever 70 preferably by means of a pin and slot connection 75—76. The member 74 is arranged in an upright position to slide through a suitable guide 77 and carried by the free extremity thereof is an anti-friction roller 78, which is adapted to be engaged by a cam 79 carried with the shaft 43, the high portion of the cam being so timed that the member 66 will be raised and will be permitted to be depressed at the proper times or steps in the cycle of operation of the mechanism.

This member 66 is adapted to be raised at a time in the cycle of operation of the machine so as to partially fold the projecting extremity or corner 80 (see Figures 3 and 9) of the cover sheet so that the corner will assume a position to be further folded and depressed upon the body portion or filler by means of another folding member 81.

This element 81 is cut away on its lower face at the forward extremity thereof as at 82 to form a downwardly opening recess extending through the extremity of said member. The upper wall of the recess or cut away portion inclines downwardly and rearwardly from the extremity of the member 81, and the side walls converge inwardly from the extremity of the member. The forward extremity of the member 81 adjacent this cut away portion 82 is bifurcated to provide a recess 83, the walls of the recess diverging from the lateral walls of the member 81 and in a direction forwardly. This shape of the folding member permits the latter to gather in the fold or extremity 80 of the cover as the member 81 is advanced to depress the folded portion upon the filler or body member. Owing to the V-shape of the recess in the forward extremity of the member 81 (see Figure 6), the margin of the cover, which has been bent up about the round corner of the filler by the member 66, will first be engaged by the member 81 at two points located one on each side of the round corner of the filler as the member 81 moves forward to fold the margin.

The member 81 is adapted for a reciprocating movement in a plane transverse to the plane of operation of the flange 69, and any suitable means may be provided for reciprocating the member 81. It is, however, preferably connected with the shaft 43 to be operated thereby through the medium of a crank arm 84 pivotally connected as at 85 with the cam 41. This arm 84 may be of any desired length and the forward end thereof is provided with a socket into which one extremity of the member 81 projects and is detachably secured to the crank arm 84 by means of a fastening screw 86, so that the member 81 may be interchanged with another member if desired.

The member 81 is so timed in the cycle of operation of the machine that it will not interfere with the operation of the folding member 66 or the operation of the member 50, and each of these members 50 and 66 are also timed so that their operation will not interfere with the operation of any of the other parts.

Figure 4:
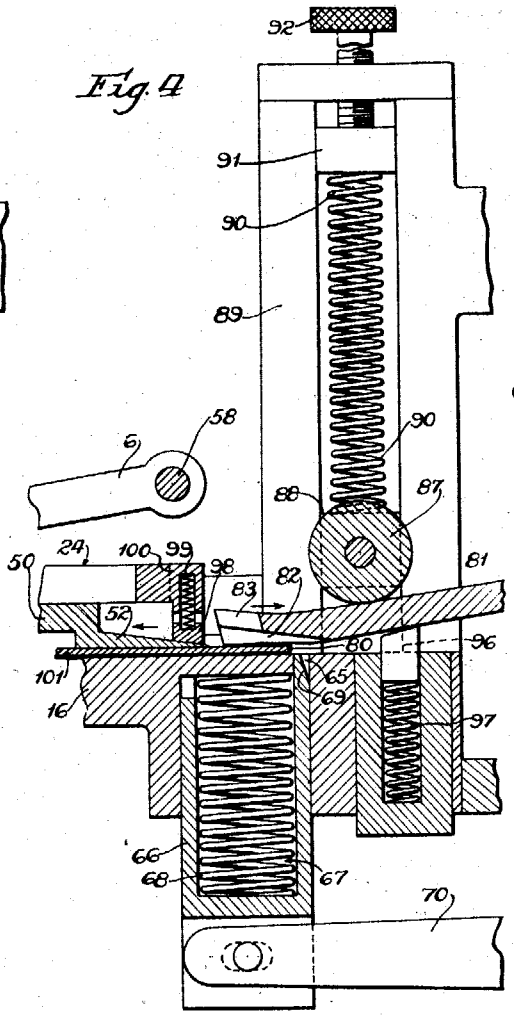
Figure 4 is a view similar to Figure 3 with parts omitted and showing the parts in a different position.

As the shaft 43 is rotated in the direction indicated by the arrow in Figure 1, the member 81 will be positively moved forwardly and backwardly and when the flange 69 is depressed from the position shown in Figure 3 to allow the turned up portion 80 of the cover to be engaged by the forward end of the member 81, the advancement of this member 81 will depress or further fold the turned up corner 80 into the position shown in Figure 4.

As a means for holding the end of the member 81 down against the work, a suitable roller 87 is provided which is journaled in suitable bearings 88, and which bearings slide in suitable guideways 89. A spring 90 engages the bearing 88 by one end and the other end of the spring engages an adjustable block or element 91 also movable in the guideways 89. An adjusting screw 92 engages the block or member 91 and through the medium of this screw 92 it will be manifest that the tension of the spring 90 may be varied to vary the pressure of the roller 87 upon the member 81. The member 81 is also supported from beneath and adjacent its forward end by means of a suitable roller 93 journaled in a bearing 94, which latter is adapted to be raised and lowered by means of an adjusting screw 95.

A scraper 96 which is preferably yieldably supported by means of a spring 97 may be disposed beneath the forward end of the member 81 for scraping therefrom any of the adhesive material such as glue, paste or the like which might adhere to the member 81.

If desired a scraper 98, controlled by a spring 99 carried by a suitable support 100 may also be provided so as to engage the upper face of the extremity 52 of the member 50 as it is reciprocated, to remove therefrom any adhesive material which might adhere thereto.

Figure 8:
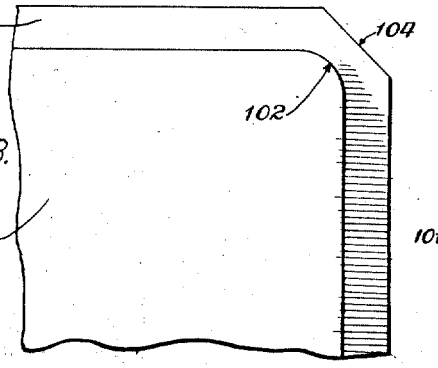
Figures 8 to 12 are detail diagrammatic views showing the different steps of folding the cover over the filler member or body portion.

In Figure 8, the filler member or body of the book cover is indicated at 101 and one of the round corners is indicated at 102.

103 designates the cover sheet of some thin material usually employed for this purpose. The corner 104 of the cover sheet is cut off as shown and the first operation is done by hand. Adhesive material having been applied along the edges of the cover sheet 103, the sides of the cover are folded over by hand until they assume the position shown at 105 in Figure 9. That is to say these edges 105 will be sealed down upon the body or filler material 101.

Figure 9:
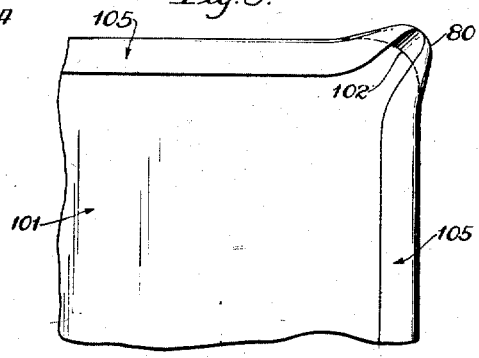

The cover, in the shape as shown in Figure 9, is then placed into the machine so that the side edges will engage the guides 17 and the corner 102 with the loop shaped portion 80 of the cover 103 formed by the folding over of the sides 105 will project through the opening between the extremities 18 of the flanges 17.

The first operation is the lowering of the clamp member 24. The lower face of the clamp member 24 is cut away as at 106 (see particularly Figures 6 and 7) so that when the clamp member engages and rests upon the cover the unsealed portions 80 at the remaining corners 102 of the book cover will not be depressed and sealed down by the clamp member 24, but the cut away portions 106 will stand over those unsealed corners which are beneath the clamp.

After the clamp has been lowered into contact with the cover the cam 62 will have assumed a position to permit the spring 63 to move the member 50 rearwardly so that the extremity 53 thereof will pass into or under the looped or folded portions 80 of the cover 103, and the member 50 will move to such an extent that the extremity 53 thereof will coincide with the rounded corner 102. This member 50 together with the portion 52 thereof will then not only constitute a shaping member but inasmuch as the lower surface thereof is flat and rests flat against the filler or body portion 101 of the cover it will serve as a re-enforcement for the corner of the filler to prevent injury thereof while the cover 103 is being folded thereover.

After the extremity 53 of the member 50 has arrived at the limit of its rearward movement so that it coincides with the corner 102, the cam 79 will be brought into operation to engage the roller 78 and depress the member 74 to rock the lever 70 about its pivot 71 and raise the element 66 so that its flange 69 will engage the corner portion 80 of the cover 103 (see Figure 3 and 10) and to fold this portion upwardly and against the edge of the round corner 102 and the extremity 103 of the member 50.

Figure 11:
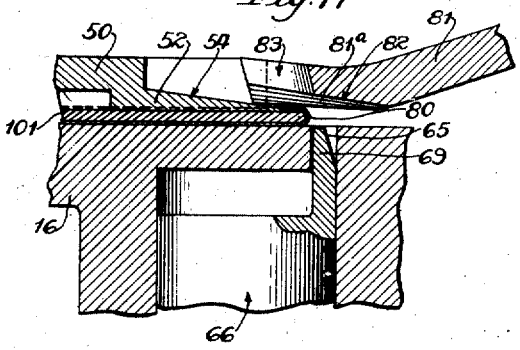

Just as the flange 69 reaches the limit of its upward movement, the member 81 will be started on its forward movement by means of the crank arm 84, and as this member 81 starts to move forwardly the cam 79 will move out of engagement with the roller 78 to permit the stress of the spring 68 to lower the element 66 and withdraw the flange 69 out of the path of the advancing movement of the extremity of the element 81. The member 81 will then continue to move forwardly (see Figure 11) to fold the portion 80 of the cover over the extremity 53 of the shaper member 52. The cut away portion 82 of the member 81 decreases in area and has ribs or corrugations 81[a] on its lower face, and as a result of the shape of this cut away extremity, will gather in the upstanding portion 80 of the cover 103 (as shown in Figure 11), during this step of the folding operation.

Just before the member 81 reaches the limit of its forward movement, the cam 62 will operate upon the bar 59 to move the latter against the stress of the spring 63, causing the member 52 to recede with a slightly greater speed than the speed of the advancement of the member 81, so as to permit the extremity 53 of the member 50 to be withdrawn from under the folded portion 80 of the cover and permit the member 81 to fold that portion down tightly upon the filler member or body portion 101 of the cover.

Figure 12:
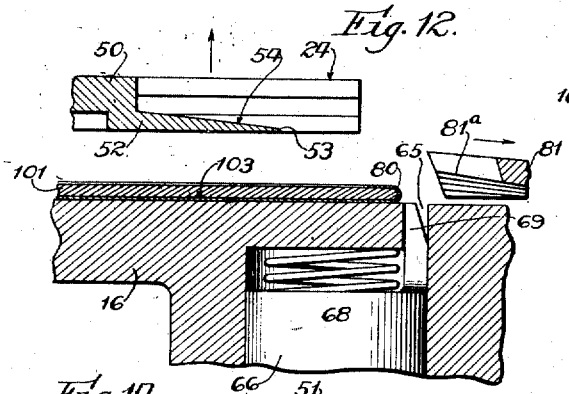
Figure 13:
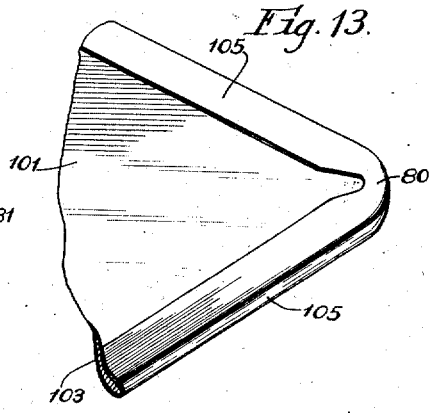
Figure 13 is a detail perspective view of one corner of the finished article.
Figure 14:
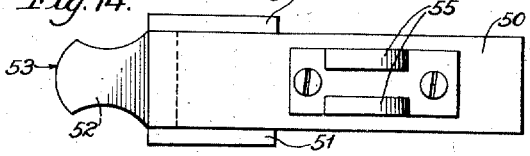
Figure 14 is a top plan view of the shaper member.

The member 81 will then recede and as it is receding (see Figure 12) the cam 41 will assume a position with respect to the roller 42 on the arm 38 so as to permit the springs 29 to raise the clamping member 24 and with it the member 50. The folded corner of the cover may then be withdrawn and the cover shifted to present another corner for the folding operation.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A machine for folding round corners of book covers, embodying means for holding the work, a shaper adapted to coincide with the corner, two separate folding means operating upon the work and transversely to each other, and means for withdrawing the shaper at a predetermined time in the cycle of operation of the machine, the said holding means embodying a reciprocable clamping element, said element supporting the said shaper for movement therewith and with respect thereto, portions of the work engaging surface of the said element being cut away to prevent pressure upon the portion of the material which has not been completely folded.

2. A machine for folding round corners of book covers, embodying means for holding the work, a shaper adapted to coincide with the corner, means for folding the work over the shaper, means for withdrawing the shaper at a predetermined time in the cycle of operation of the machine, and a scraper for cleaning the surface of the said shaper.

3. A machine for folding round corners of book covers, embodying means for holding the work, a shaper adapted to coincide with the corner, means operating upon the work to fold the work over the shaper, means for withdrawing the shaper at a predetermined time in the cycle of operation of the machine, and a scraper for cleaning the surface of the said folding means.

4. A machine for folding round corners of book covers, embodying a reciprocable clamping element for holding the work, a shaper member carried with the clamping element and for movement with respect thereto, an actuator for the shaper member and with respect to which actuator the shaper element is bodily shiftable, a link connection between the shaper and actuator, two folding means operable upon the work transverse to each other, and means for actuating the parts in timed relation with respect to each other.

5. A machine for folding round corners of book covers, embodying a reciprocable clamping element for holding the work, a shaper member carried with the clamping element and for movement with respect thereto, an actuator for the shaper member and with respect to which actuator the shaper element is bodily shiftable, a link connection between the shaper and actuator, two folding means operable upon the work transverse to each other, means for actuating the parts in timed relation with respect to each other, and means for simultaneously adjusting the clamping element and the shaper member with relation to their respective actuating means for compensating different thicknesses of work to be operated upon.

6. A machine for folding round corners of book covers, embodying means for holding the work, a shaper member adapted to coincide with the corner of the work operated upon, two separate folding means operable upon the portion to be folded and transversely with respect to each other and while the shaper is in position, one of the folding means also further operating upon the work after the shaper is removed, means for removing the shaper, and means for actuating the said folding means, one of the said folding means embodying a reciprocable element, the work engaging end of which is cut away on its lower face to form a cavity inclining downwardly and extending backwardly from said end.

7. A machine for folding round corners of book covers, embodying means for holding the work, a shaper member adapted to coincide with the corner of the work operated upon, two separate folding means operable upon the portion to be folded and transversely with respect to each other and while the shaper is in position, one of the folding means also further operating upon the work after the shaper is removed, means for removing the shaper, and means for actuating the said folding means, one of the said folding means embodying a reciprocable element, the work engaging end of which is cut away on its lower face to form a cavity inclining downwardly and extending backwardly from said end, the wall of said cavity being ribbed, the ribs extending in the direction of reciprocation of said element.

8. A machine for folding round corners of book covers, embodying means for holding the work, a shaper adapted to coincide with the corner, two separate folding means operating upon the work and transversely with respect to each other, means for withdrawing the shaper at a predetermined time in the cycle of operation of the machine, means for compensating different thicknesses of work to be operated upon, means for varying at will the extent of operation of the holding means to compensate for different thicknesses of the work, and means for correspondingly adjusting one of the said folding means.

9. For use in a machine for folding round corners of book covers, a combined shaper and work re-enforcing element having a rounded extremity adapted to be passed under the partially folded material to a position to coincide with the round corner of the work, the upper surface of the said element extending upwardly and rearwardly from said extremity and being convexed in a direction transverse to the length thereof.

10. A machine for operating upon a piece of work which comprises a book cover the margin of which has been folded over upon the margin of a filler along the straight edges of said filler adjacent to a rounded corner thereof, said machine having in combination a work support, means for clamping the work to the work support, a shaper having a rounded end, means for moving the shaper over the filler into a position adjacent to the margin at the corner of the cover, a folder having in its work-engaging portion a recess, the walls of which diverge in a plane substantially parallel to that of the work support, means for causing the folder to fold the margin at the corner of the cover over the shaper, and means for withdrawing the shaper.

11. A machine for folding the margin at the corner of a book cover over the round corner of a filler, having in combination a work support, means for clamping the filler and the cover upon the support, a shaper having a rounded end the curvature of which is substantially the same as that of the round corner of the filler, means for moving the shaper over the clamped work into a position in which its rounded end substantially registers with the rounded cover of the filler, a folder having in its operative portion a recess the walls of which diverge toward the shaper, means for causing the folder to fold the margin at the corner of the cover over the shaper, and means for withdrawing the shaper.

12. A machine for folding the round corners of book covers having, in combination, a work support, a clamp movable toward and from the work support, a shaper having a curved operative edge, said shaper being movable with the clamp toward and from the work support and also movable with respect to the clamp in a direction substantially parallel to the work support to cause the curved edge to register substantially with the desired curved line of fold to be made at the corner of the cover, a folder having a recess in its operative face, and means for causing the folder to fold the margin at the corner of the cover.

13. A machine for folding the margin of a book cover over the edge of a filler having, in combination, a substantially flat work support, a folder, a support for the folder, means for reciprocating the folder over the folder support and over the work support and a cleaning member other than the folder support adapted to contact at all times with the under surface of the folder.

14. A machine for folding the corner of a book cover over the round corner of a filler having, in combination, a work support, a clamp and a shaper normally held above the work support, said shaper having a curved edge, means for bringing the clamp and the shaper down upon the work and for moving the shaper over the work into a position in which its curved edge registers with the rounded edge at the corner of the filler, a folder having a recess the walls of which diverge in a plane substantially parallel to the work support, and means for causing the folder to fold the margin at the corner of the cover over the edge of the shaper.

15. A machine for folding the margin at the corner of a book cover over the round corner of a filler having, in combination, a work support, means for causing the margin at the corner of the cover to be bent up about the round corner of the filler, and means for folding the bent-up margin progressively beginning at two points located one on each side of the extremity of the round corner of the filler.

16. A machine for folding the margin at the corner of a book cover over the round corner of a filler having, in combination, a work support, a shaper having a rounded end adapted to register with the round corner of the filler, and means for folding the margin at the corner of the cover progressively over the shaper beginning at two points located one on each side of the round corner of the filler.

17. A machine for folding the margin at the corner of a book cover over the round corner of a filler having, in combination, a work support having an end curved to correspond to the curvature at the round corner of the filler, a shaper having an end curved in substantially the same manner, means for bringing the curved end of the shaper into register with the round corner of the filler, means for bending up the margin at the corner of the cover, a folder having a V-shaped recess in its end, and means for moving the folder over the shaper, whereby the bent up margin is progressively folded beginning at two points located one at each side of the extremity of the round corner of the filler.

In testimony whereof we have signed our names to this specification.

CARL G. ROLINE.
CHAS. NORRE.